United States Patent
Gupta et al.

(10) Patent No.: US 11,368,464 B2
(45) Date of Patent: Jun. 21, 2022

(54) MONITORING RESOURCE UTILIZATION OF AN ONLINE SYSTEM BASED ON STATISTICS DESCRIBING BROWSER ATTRIBUTES

(71) Applicant: salesforce.com, inc., San Francisco, CA (US)

(72) Inventors: Ankur Gupta, San Francisco, CA (US); Anuj Gargeya Malkapuram, Union City, CA (US)

(73) Assignee: salesforce.com, inc., San Francisco, CA (US)

(*) Notice: Subject to any disclaimer, the term of this patent is extended or adjusted under 35 U.S.C. 154(b) by 197 days.

(21) Appl. No.: 16/698,970

(22) Filed: Nov. 28, 2019

(65) Prior Publication Data

US 2021/0168147 A1 Jun. 3, 2021

(51) Int. Cl.
*H04L 9/40* (2022.01)

(52) U.S. Cl.
CPC ............ *H04L 63/102* (2013.01); *H04L 63/08* (2013.01)

(58) Field of Classification Search
CPC ... H04L 63/102; H04L 63/08; H04L 63/1425; H04L 63/083
See application file for complete search history.

(56) References Cited

U.S. PATENT DOCUMENTS

| | | | |
|---|---|---|---|
| 8,286,220 B2 | 10/2012 | Forristal | |
| 8,392,841 B1* | 3/2013 | Bowden | G06F 16/95 715/760 |
| 8,601,119 B1* | 12/2013 | Vassilakis | G06F 16/958 709/224 |
| 8,694,374 B1* | 4/2014 | Diligenti | G06Q 30/02 705/14.47 |
| 9,600,651 B1* | 3/2017 | Ryan | H04L 63/14 |
| 9,860,208 B1* | 1/2018 | Ettema | H04L 63/0227 |
| 9,979,747 B2 | 5/2018 | Bailey et al. | |
| 10,134,159 B1* | 11/2018 | Fermum | G06T 11/206 |
| 10,142,362 B2 | 11/2018 | Weith et al. | |
| 10,212,170 B1* | 2/2019 | Canavor | H04L 63/1491 |
| 10,237,298 B1* | 3/2019 | Nguyen | H04L 63/20 |

(Continued)

OTHER PUBLICATIONS

Revulytics, Inc., "Get More From Your Data," 2018, one page.
(Continued)

*Primary Examiner* — Aravind K Moorthy
(74) *Attorney, Agent, or Firm* — Fenwick & West LLP

(57) ABSTRACT

An online system monitors resources utilization by users connecting with the online system and detects unauthorized resource utilization. The online system collects samples of browser attributes from browsers interacting with the online system. The online system determines statistics describing the browser attributes based on the collected samples for that user. The online system receives values of browser attributes for a new request received from a user and determines a browser score indicating a likelihood that the new request was sent from a new client device different from the client devices used by the user during the time interval. If the online system determines that the score indicates that the new request was sent by the new client device, the online system takes mitigating actions to control the unauthorized resource utilization, for example, by requesting credentials for authenticating the request.

20 Claims, 6 Drawing Sheets

(56) References Cited

U.S. PATENT DOCUMENTS

| | | | | |
|---|---|---|---|---|
| 10,387,911 | B1* | 8/2019 | Shaw | G06Q 30/0248 |
| 10,645,086 | B1* | 5/2020 | Hadler | H04L 63/083 |
| 2006/0230058 | A1* | 10/2006 | Morris | G06Q 10/063 |
| 2008/0162338 | A1* | 7/2008 | Samuels | G06Q 40/025 |
| | | | | 705/38 |
| 2008/0244744 | A1* | 10/2008 | Thomas | H04L 43/10 |
| | | | | 726/23 |
| 2008/0249786 | A1* | 10/2008 | Oldham | G06F 16/951 |
| | | | | 705/1.1 |
| 2009/0006577 | A1* | 1/2009 | Estrada | G06F 16/27 |
| | | | | 709/217 |
| 2012/0317620 | A1* | 12/2012 | Fefelov | G06Q 30/02 |
| | | | | 726/4 |
| 2013/0061285 | A1* | 3/2013 | Donfried | G06F 21/316 |
| | | | | 726/3 |
| 2014/0278942 | A1* | 9/2014 | Buffamanti | G06Q 50/01 |
| | | | | 705/14.45 |
| 2014/0283069 | A1* | 9/2014 | Call | G06F 21/566 |
| | | | | 726/23 |
| 2015/0193395 | A1* | 7/2015 | Nicolaou | G06F 16/24578 |
| | | | | 707/726 |
| 2015/0237049 | A1 | 8/2015 | Grajek et al. | |
| 2015/0269129 | A1* | 9/2015 | Dou | G06F 16/955 |
| | | | | 715/208 |
| 2015/0341385 | A1* | 11/2015 | Sivan | H04L 63/1466 |
| | | | | 726/23 |
| 2016/0006730 | A1* | 1/2016 | Chari | H04L 63/0861 |
| | | | | 726/7 |
| 2016/0142443 | A1* | 5/2016 | Ting | H04L 63/20 |
| | | | | 726/1 |
| 2016/0171901 | A1* | 6/2016 | Beketayev | G09B 7/02 |
| | | | | 434/362 |
| 2016/0241561 | A1* | 8/2016 | Bubany | H04L 63/1433 |
| 2017/0070521 | A1* | 3/2017 | Bailey | G06F 21/32 |
| 2017/0070533 | A1 | 3/2017 | Bailey et al. | |
| 2017/0075954 | A1* | 3/2017 | Alpers | G06F 16/2453 |
| 2017/0139969 | A1* | 5/2017 | Zhang | G06F 16/9535 |
| 2017/0168924 | A1* | 6/2017 | Dereszynski | G06F 11/3684 |
| 2018/0053199 | A1* | 2/2018 | Mathis | G06F 16/285 |
| 2018/0069883 | A1* | 3/2018 | Meshi | G06N 20/00 |
| 2018/0176272 | A1* | 6/2018 | Zur | H04L 65/80 |
| 2018/0241745 | A1* | 8/2018 | Laporta | G06F 21/33 |
| 2018/0278725 | A1* | 9/2018 | Thayer | H04L 67/2804 |
| 2018/0288060 | A1* | 10/2018 | Jackson | H04L 63/102 |
| 2019/0068627 | A1 | 2/2019 | Thampy | |
| 2019/0244131 | A1* | 8/2019 | Levi | G06N 5/04 |
| 2019/0306248 | A1 | 10/2019 | Swarangi et al. | |
| 2019/0336867 | A1 | 11/2019 | Verma et al. | |
| 2020/0028926 | A1* | 1/2020 | Sprague | H04L 9/0877 |
| 2020/0110623 | A1* | 4/2020 | Vangala | G06F 16/951 |
| 2020/0250316 | A1* | 8/2020 | Rickerd | G06F 21/577 |
| 2020/0412717 | A1* | 12/2020 | Puertas Calvo | H04L 63/0876 |
| 2021/0011880 | A1* | 1/2021 | Marelas | G06F 3/0665 |
| 2021/0075689 | A1* | 3/2021 | Ramanathan | H04L 41/147 |
| 2021/0136059 | A1* | 5/2021 | Gupta | H04L 63/10 |
| 2021/0168147 | A1 | 6/2021 | Gupta et al. | |
| 2021/0200955 | A1* | 7/2021 | Ben Kimon | G06Q 20/4016 |

OTHER PUBLICATIONS

Revulytics, Inc., "Product Usage Analytics for Data-Driven Software Development and License Compliance," Date Unknown, 11 pages, [Online] [Retrieved on Jan. 19, 2020] Retrieved from the Internet <URL: https://www.revulytics.com/>.

ServiceNow, "ServiceNow—Digital Workflows for Enterprise—Make work, work better.," Date Unknown, eight pages,[Online] [Retrieved on Jan. 19, 2020] Retrieved from the Internet <URL https://www.servicenow.com/>.

Hausknecht, D., "Web Application Content Security," Department of Computer Science and Engineering, Chalmers University of Technology, Goteberg, Sweden, 2018, ISBN 978-91-7597-768-3, pp. 1-173.

Runiassy, M., "Modeling Cloud-Computing Threats and Vulnerabilities," Thesis, Dec. 2016, pp. 1-1000.

United States Office Action, U.S. Appl. No. 16/675,094, dated Sep. 17, 2021, 18 pages.

* cited by examiner

MONITORING RESOURCE UTILIZATION OF AN ONLINE SYSTEM BASED ON STATISTICS DESCRIBING BROWSER ATTRIBUTES

BACKGROUND

Field of Art

This disclosure relates in general to monitoring resource utilization in online systems, and in particular to detecting unauthorized resource utilization based on statistics describing browser attributes collected over a time interval.

Description of the Related Art

Online systems such as multi-tenant systems provide services to enterprises. A multi-tenant system may support multiple tenants, each tenant representing an enterprise. Users from an enterprise connect with the multi-tenant system to use the services offered by the online system. Such online systems typically limit utilization of resources of the online system by an enterprise. For example, an online system may enforce a limit on the number of sessions that users of the enterprise can create within a time interval or the number of concurrent sessions that users of the enterprise can create.

Enterprises may exceed the allotted utilization for them. For example, users of a small enterprise may share credentials necessary to create sessions with the multi-tenant system. As a result, the number of users that interact with the online system exceeds the number of valid credential issued by the multi-tenant system resulting in higher resource utilization.

A larger enterprise may not prefer sharing of credentials since a single user can modify the credentials thereby affecting a large number of other users. However, larger enterprises can implement an infrastructure that allows multiple client devices to reuse a session. Such infrastructure may be implemented using hardware and software maintained by an IT (information technology) organization of the enterprise. This allows the enterprise to exceed the allotted resource utilization without requesting new sessions.

Online systems would like to ensure that enterprises that use their services do not exceed the allotted resource utilization. Conventional techniques detect unauthorized use of credentials, for example, if a user steals credentials from an enterprise to connect with the online system. However, conventional techniques fail to detect unauthorized resource utilization by an enterprise. For example, if each session is created by a client device of the enterprise using valid credentials, conventional techniques allow these sessions as valid sessions and do not detect unauthorized resource utilization by the enterprise.

Figure 1:
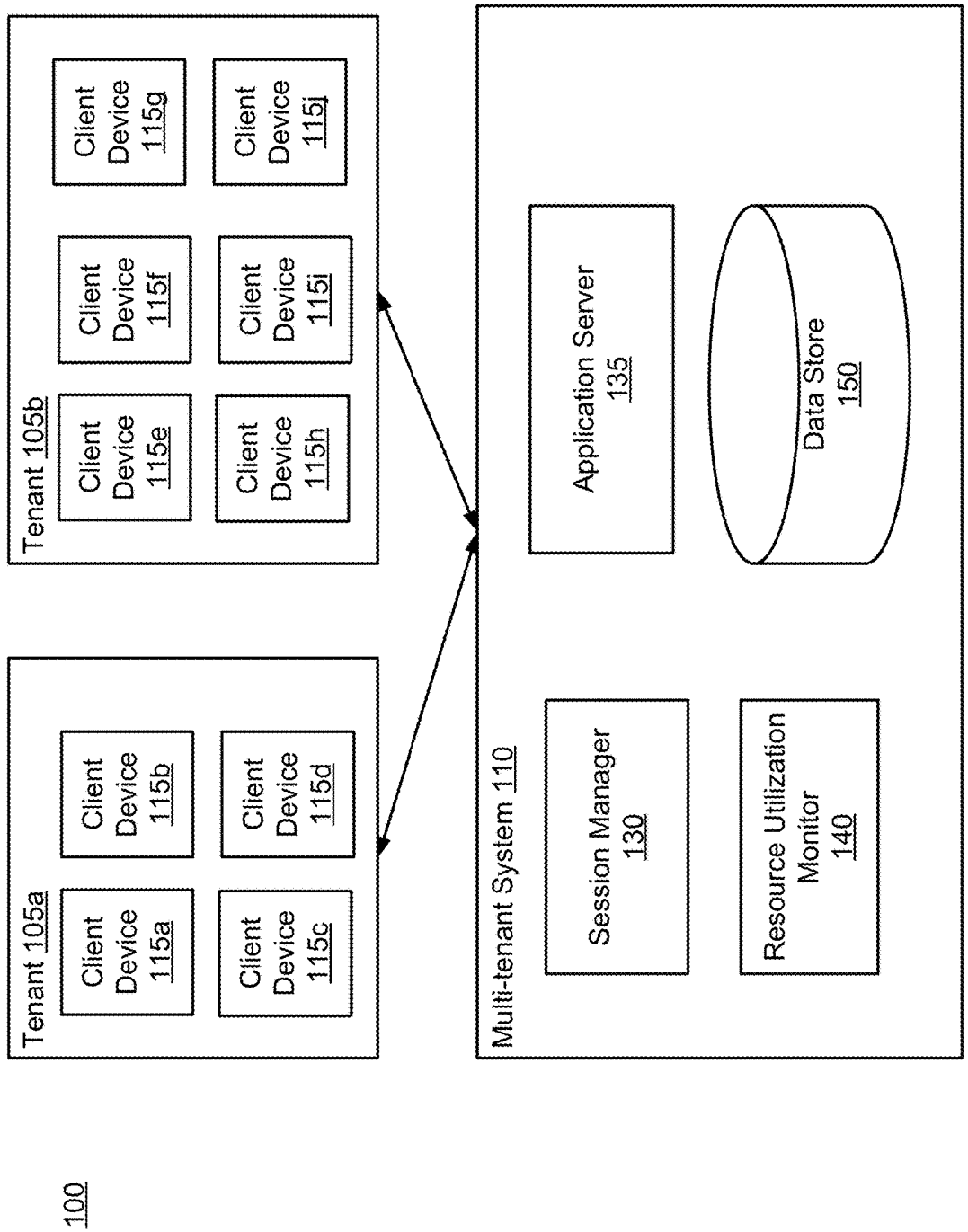
FIG. 1 is a block diagram of a system environment illustrating monitoring of resource utilization of a system, according to one embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "105a," indicates that the text refers specifically to the element having that particular reference numeral. A reference numeral in the text without a following letter, such as "105," refers to any or all of the elements in the figures bearing that reference numeral.

DETAILED DESCRIPTION

An online system, for example, a multi-tenant system offers services to enterprises. Each enterprise represents a set of users that can use the services offered by the online system. An enterprise typically has an agreement with the online system that limits the amount of resources of the online system utilized by users of the enterprise. For example, the online system may impose a limit on the number of sessions that users of the enterprise can create with the online system within a time interval. Alternatively, the online system may provide a limited number of credentials for user accounts of the online system. The online system uses the number of sessions or the number of user accounts as an estimate of the amount of resources used. As an example, if a typical user utilizes x amount of resources with a session and the enterprise has an agreement to limit the number of sessions to N within a time interval, the estimated resource utilization by the enterprise is $N*x$.

However, an enterprise can exceed the allotted amount of resource utilization by sharing sessions across users. For example, if a session is created for one user using one set of credentials but shared by m users, the enterprise effectively utilizes $N*x*m$ resources of the online system. This resource utilization can be much higher than the amount agreed upon with the enterprise. The online system may not detect this excess resource utilization since the enterprise did not exceed the number of sessions that the enterprise is allowed to create and each session was created using valid credentials. Such resource utilization is considered unauthorized resource utilization.

Embodiments of the invention monitor resource utilization by enterprises of the online system and detect unauthorized resource utilization. The online system collects samples of browser attributes from browsers used by authorized users to access a resource of the online system. The samples are collected over a time interval, for example, 30 days. The online system collects statistics describing various browser attributes based on these samples. In an embodiment, the statistics are collected per user account. The online system analyzes browser attributes of any subsequent request with the statistics describing the browser attributes to determine whether the browser used to send the request was previously used by the user or a new browser. This allows the online system to determine whether session tokens are being shared in an unauthorized manner by an enterprise.

The online system performs the following steps for each user. In an embodiment, each user has a user account with the online system. The online system determines statistics describing the browser attributes based on the collected samples for that user. The online system receives values of browser attributes for a new request received from a user. The online system determines a browser attribute score for each browser attribute corresponding to the new request. The online system determines the browser attribute score based on the received value of the browser attribute and the statistical distribution of the browser attribute for the user. The online system aggregates the browser attribute scores for the different browser attributes to determine a browser. The browser score indicates a likelihood that the new request was sent from a new client device different from the client devices used by the user during the time interval. If the online system determines that the score indicates that the new request was sent by the new client device, the online system determines that there is a high likelihood that the enterprise is performing unauthorized resource utilization. The online system may take mitigating actions to control the unauthorized resource utilization, for example, by requesting credentials for authenticating the new request. If an enterprise is using an automatic mechanism to share sessions, the user associated with the new request is unlikely to be able to provide valid credentials.

Techniques for monitoring resource utilization based on browser attributes collected for a session are described in the U.S. patent application Ser. No. 16/675,094, filed on Nov. 5, 2019, which is herein incorporated by reference it is entirety.

Overall System Environment

In an embodiment, the online system is a multi-tenant system. Although several details described herein are described in connection with a multi-tenant system, the techniques are applicable to any online system.

FIG. 1 is a block diagram of a system environment illustrating monitoring of resource utilization of a system, according to one embodiment. The system environment 100 comprises a multi-tenant system 110 and one or more tenants 105, each tenant representing an enterprise or an organization associated with client devices 115 that connect with the multi-tenant system 110. In other embodiments, the system environment 100 may include more or fewer components.

The multi-tenant system 110 stores data of one or more tenants. Each tenant may be an enterprise or an organization that represents a customer of the multi-tenant system 110. Each tenant 105 may have multiple users that interact with the multi-tenant system via client devices 115. Various elements of hardware and software of the multi-tenant system 110 may be shared by multiple tenants.

In one embodiment, multi-tenant system 110 implements a web-based customer relationship management (CRM) system. For example, the multi-tenant system 110 may store applications configured to implement and execute CRM software applications. As an example, one tenant 105 might be a company that employs a sales force where each salesperson uses a client device 115 to manage their sales process. Thus, a user might maintain contact data, leads data, customer follow-up data, performance data, goals and progress data, etc., all applicable to that user's personal sales process.

The multi-tenant system 110 comprises a session manager 130, an application server 135, a resource utilization monitor 140, and a data store 150. The application server 135 provides various applications that can be used by tenants of the multi-tenant system 110. The application server 135 may simultaneously process requests for a number of tenants.

The data store 150 stores data for various tenants of the multi-tenant system 110. It is transparent to tenants that their data may be stored in a data store 150 that is shared with data of other tenants. The data store 150 may store data for different tenants in separate physical structures, for example, separate database tables or separate databases. Alternatively, the data store 150 may store data of multiple tenants in a shared structure. For example, user accounts for all tenants may share the same database table. However, the multi-tenant system 110 stores additional information to logically separate data of different tenants. Accordingly, data of one tenant is kept logically separate from that of other tenants so that one tenant does not have access to another tenant's data, unless such data is expressly shared.

The client devices 115 for each tenant 105 create sessions with the multi-tenant system 110. A client device 115 executes a browser that is used by a user to interact with the multi-tenant system 110. Examples of browsers include INTERNET EXPLORER, CHROME, SAFARI, FIREFOX, and so on. A browser may be a proprietary application of a tenant used to interact with the multi-tenant system.

The multi-tenant system 110 provides credentials that are used by client devices 115 to send requests to the multi-tenant system 110 via browsers. The session manager 130 of the multi-tenant system 110 receives requests to create sessions from client devices 115 along with credentials for verifying authenticity of the requests. The session manager 130 verifies the credentials to make sure that the request is from a valid user associated with a tenant 105. The session manager 130 creates a session for the requestor responsive to receiving valid credentials.

In an embodiment, the session manager 130 issues a session token in response to the request to create the session. The session token is subsequently provided by browsers executing on client devices 115 when they send requests for processing by the multi-tenant system 110. The multi-tenant system 110 processes requests if they are accompanied with valid session tokens. A session token may be valid for a predetermined period of time. Once a session token expires, the client device 115 is required to request a new session token to continue interacting with the multi-tenant system 110.

A tenant 105 may have an agreement with the multi-tenant system, for example, a license that limits the number of user accounts that are allowed to create sessions with the multi-tenant system or a license that imposes a limit on the maximum number of sessions that the tenant 105 is allowed to create within a time interval. The session manager 130 ensures that the sessions created by users of the tenant stays within any limits imposed by an agreement with the tenant. If a tenant attempts to create more sessions than are allowed, the session manager may deny the request or send a message to a system administrator of the tenant to revise the agreement to increase the number of allowed sessions.

As discussed herein, a tenant may reuse session tokens across multiple browsers to increase resource utilization without creating additional sessions. Each user may have multiple sessions running at the same time and accordingly multiple active session tokens at the same time. The resource utilization monitor 140 ensures that the resource utilization of multi-tenant system 110 by client devices of a tenant 105 is within an allotted quota. The resource utilization monitor 140 tracks session tokens issued by the session manager and determines whether the same session token is being used by multiple browsers. If the resource utilization monitor 140 detects excess resource utilization by a tenant, the resource utilization monitor 140 takes mitigating action, for example, by denying subsequent requests to create sessions by client devices of the tenant 105 responsive to detecting unauthorized resource utilization. Alternatively, the multi-tenant system 110 may send a message to a system administrator of the tenant 105 indicating excess resource utilization by the tenant with a request to revise the agreement with the multi-tenant system 110 in accordance with the high level of resource utilization.

Various components shown in FIG. 1 including the client devices 115 and the multi-tenant system 110 represent computing devices. A computing device can be a conventional computer system executing, for example, a Microsoft™ Windows™-compatible operating system (OS), Apple™ OS X, and/or a Linux distribution. A computing device can also be a client device having computer functionality, such as a personal digital assistant (PDA), mobile telephone, video game system, etc. Each computing device stores software modules storing instructions. The interactions between the various components of the system environment 100 are typically performed via a network, not shown in FIG. 1.

Although embodiments disclosed herein are described in connection with a multi-tenant system, the techniques disclosed are applicable to other online systems as well. For example, an online system may provide services to one or more enterprises with a limit on the resource utilization of each enterprise. The online system can use the techniques disclosed herein to determine whether any enterprise is performing unauthorized resource utilization by sharing sessions.

System Architecture

Figure 2:
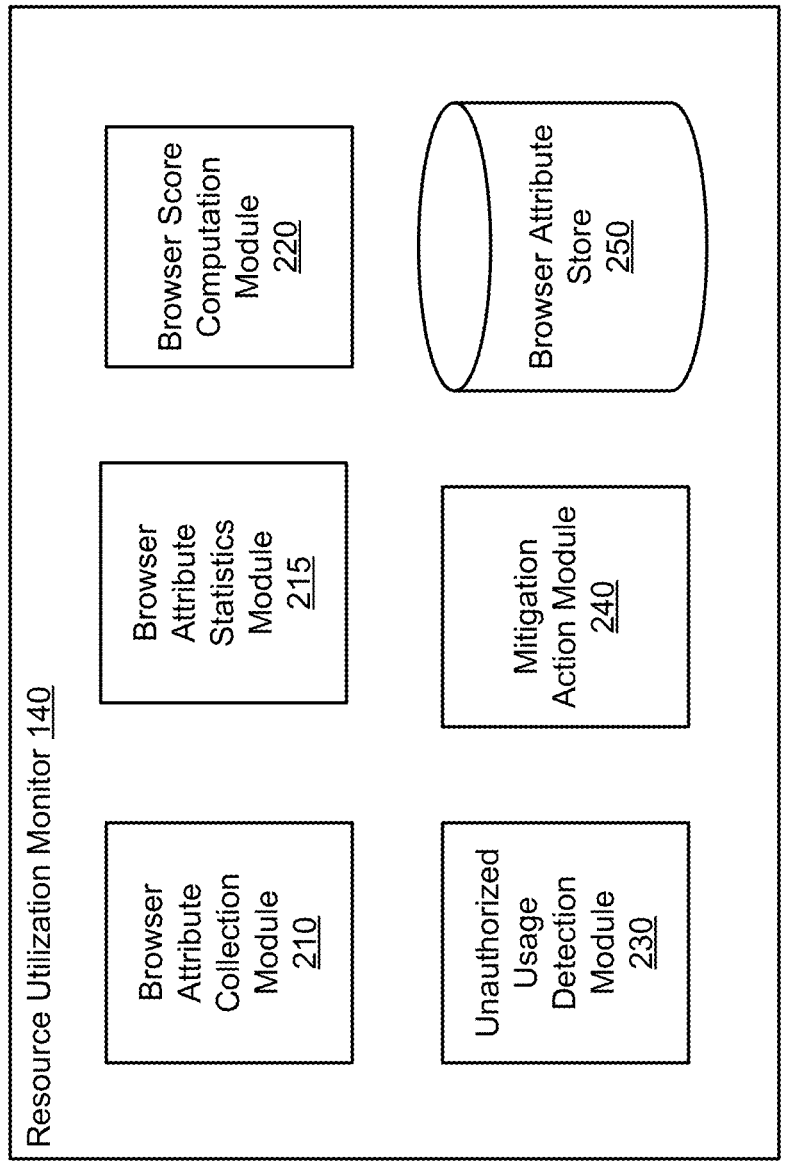
FIG. 2 is a block diagram illustrating components of a resource utilization monitor, according to one embodiment.

FIG. 2 is a block diagram illustrating components of a resource utilization monitor according to one embodiment. The resource utilization monitor 140 comprises a browser attribute collection module 210, a browser attribute statistics module 215, a browser score computation module 220, an unauthorized usage detection module 230, a mitigation action module 240, and a session data store 250. Other embodiments can have different and/or other components than the ones described here, and that the functionalities can be distributed among the components in a different manner.

The browser attribute collection module 210 periodically receives samples of browser attributes associated with a session and stores them in the browser attribute store 250. A sample of browser attributes may also be referred to herein as a set of browser attributes. For example, the browser attribute collection module 210 may receive samples of browser attributes associated with a session every 5 minutes.

A sample of browser attributes includes browser attributes of various types. Each sample of browser attributes describes the browser that was used to interact with the multi-tenant system 110 via a session. Examples of browser attributes that are received from a browser executing on a client device include (1) IP (internet protocol) address of the client device, (2) platform representing the operating system executing on the client device, (3) CPU (central processing unit) class representing the type or architecture of CPU of the client device, (4) languages supported by the browser, (5) fonts supported the browser, (6) plugins on the browser, (7) media devices attached to the client device, (8) codecs supported by the browser, (9) time zone offset of the browser representing a number of minutes from GMT time, (10) a user agent identifying the type of browser, (11) autonomous system number (ASN), (12) information describing the screen on which the browser was displayed such as the screen resolution, (13) do not track setting represented as a boolean value, (14) a digital rights management setting of the browser, and so on.

In an embodiment, the multi-tenant system 110 sends instructions of a scripting language for execution on the browser, for example, JAVASCRIPT instructions. These instructions include functions to extract various browser attributes and send them to the multi-tenant system. These instructions are typically installed with permission of the user interacting with the multi-tenant system or by a system administrator of the tenant as part of an agreement with the multi-tenant system 110. The browser attribute collection module 210 tracks session tokens and stores the browser attributes in association with the session token of the session used by the browser for interacting with the multi-tenant system.

The browser attribute statistics module 215 collects statistics describing each browser attribute. In an embodiment, the statistics describing each browser attribute is a histogram representing the frequency of occurrence of each value of the browser attribute or a likelihood of occurrence of each value of the browser attribute. The browser attribute statistics module 215 collects and stores browser attribute statistics for each user.

The browser score determination module 220 determines a browser score for a new request indicating whether the request was received from a new client device or a new browser instance. The browser score determination module 220 determines a browser attribute score for each browser attribute based on a value of the browser attribute and statistics describing the browser attribute.

The unauthorized usage detection module 230 receives a new request from a user and determines a browser score for the request using the processes described herein. It determines whether the new request represents a browser of the same tenant as a browser used for sending previous requests during a time interval during which samples of browser attributes were collected and used for determining statistics describing the browser attributes. It further determines whether the new request was sent from a browser or a client device that was not previously used according to the browser statistics. Accordingly, the unauthorized usage detection module 230 determines whether a tenant is performing unauthorized usage of resources. If the unauthorized usage detection module 230 detects unauthorized usage by a tenant, it flags the unauthorized resource utilization by the tenant to the mitigation action module 240.

If the unauthorized usage detection module 230 flags unauthorized resource utilization by the tenant, the mitigation action module 240 takes mitigation actions. The mitigation action module 240 may alert a user of the enterprise or a system administrator of the multi-tenant system 110 about the unauthorized resource utilization. The mitigation action module 240 may provide the enterprise with a recommendation to revise the agreement with the multi-tenant system 110, for example, by acquiring more licenses. In an embodiment, the mitigation action module 240 aggregates various instances of unauthorized resource utilization by the tenant to determine an estimate of actual resource usage of the tenant. The mitigation action module 240 uses the estimate of actual resource usage to recommend a number of licenses that the tenant requires based on the actual usage.

In an embodiment, the mitigation action module 240 requires the end user to pass enhanced authentication, for example, a captcha. If the enterprise is running automated processes that reuse session tokens across multiple browsers, requiring the users to pass a captcha requires manual intervention, thereby causing the automatic process to fail.

In an embodiment, the mitigation action module 240 requires the user to re-enter credentials, for example, re-enter password previously used to create the session. If the tenant is sharing session tokens across users without providing them valid credentials, the users are unlikely to be able to provide the credentials. If the enterprise shares the same password with multiple users, the mitigation action module 240 may not be able to stop the unauthorized resource utilization by requiring users to re-enter credential. However, enterprises that are large are unlikely to share credentials across users since any user can modify the credentials, thereby disrupting the use of the multi-tenant system by other users of the enterprise. In an embodiment, the mitigation action module 240 logs out the user suspected of unauthorized resource utilization. This forces the user to re-authenticate by re-entering credential to obtain a new session token. This mitigation action has same effect as requiring the user to re-enter credentials.

The mitigating actions taken by the mitigation action module 240 to prevent unauthorized resource utilization are different from mitigation actions that may be taken if a user outside the enterprise is determined to have stolen credentials. For example, if a user outside the enterprise has stolen credentials, it is ineffective to request the user to re-enter credentials since the user is in possession of valid credentials. Similarly, logging out the user is also ineffective since the user has stolen credentials that the user can re-enter. In contrast these mitigation actions are effective against unauthorized resource utilization if an enterprise does not share credentials across users but uses an automatic mechanism to share sessions across browsers.

Browser Attribute Statistics

FIGS. 3(A-B) illustrate statistics describing browser attributes collected by the browser attribute statistics module, according to an embodiment. The process of combining distinct values of a browser attribute into a group may be referred to as grouping. An example of a group is a bin that corresponds to a range of values. In this case, the process of grouping is called binning. Groups may be created in other ways than binning, for example, by collecting sets of possible values of attributes based on any criteria, such as certain characteristic of the attribute. The groups of a browser attribute may be created based on values of other browser attributes. For example, IP addresses may be grouped based on geographical regions or based on an organization structure of the enterprise.

In an embodiment, if a browser attribute has less than a threshold number of distinct possible values, the browser attribute statistics module 215 determines the frequency of occurrence of each distinct possible value for the attribute and stores the results. If the browser attribute has more than the threshold number of distinct possible values, the browser attribute statistics module 215 divides the distinct possible values into a set of ranges of values and determines the frequency of occurrence of values in each range and stores the results.

The browser attribute statistics module 215 may determine a likelihood of occurrence of a distinct browser attribute value or a range of browser attribute values. For example, if the number of occurrences of a distinct browser attribute value or a range of browser attribute values is N and the total number of samples is T, the browser attribute statistics module 215 determines the likelihood of occurrence of the browser attribute value or a range of browser attribute values as the value N/T.

Figure 3B:
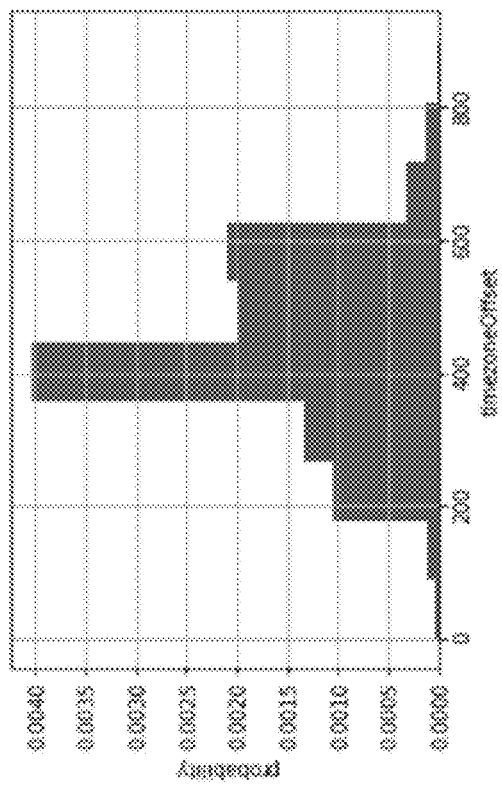
FIGS. 3(A-B) illustrate statistics describing browser attributes, according to an embodiment.
Figure 3A:
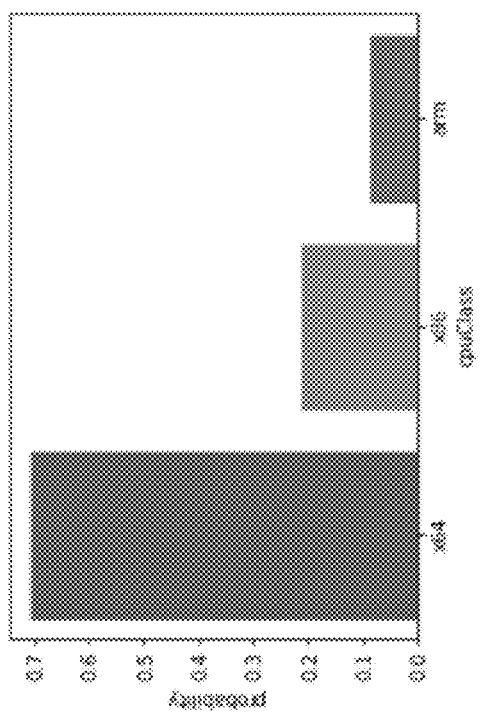

FIG. 3A shows statistics describing browser attribute CPU class. The browser attribute CPU class has three values, x64, x86, and arm. The browser attribute statistics module 215 determines a frequency of occurrence of each distinct value of the browser attribute and determines a probability or likelihood of occurrence of the value in any given sample of browser attribute. FIG. 3B shows statistics of another browser attribute time zone offset. The browser attribute statistics module 215 divides the time zone offset values into ranges and determines a likelihood that the time zone offset value of a sample falls within each range.

Overall Process

Figure 4:
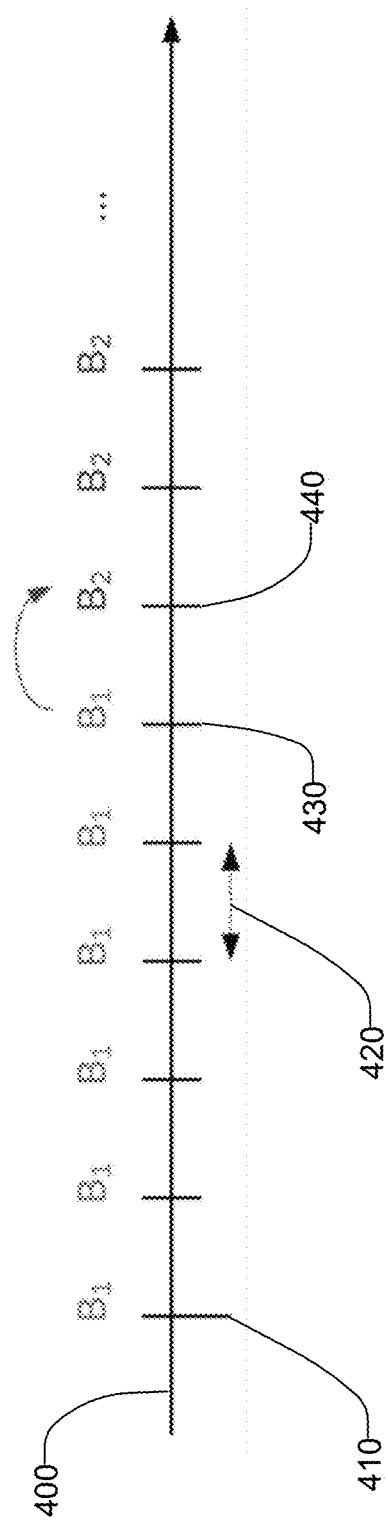
FIG. 4 illustrates collection of browser attributes and their analysis, according to one embodiment.

FIG. 4 illustrates collection of browser attributes and their analysis, according to one embodiment. FIG. 4 shows a time line 400 associated with a user of the multi-tenant system 110. The first data point 410 on the time line indicates a sample of browser attributes received when the user logs in and initiates the session. For the rest of the session, the resource utilization monitor 140 periodically obtains the browser attributes for the session, for example, every 5 minutes as indicated by the time interval 420. In an embodiment, the multi-tenant system 110 allows a system administrator to configure the rate at which the browser attributes are obtained.

The resource utilization monitor 140 determines a browser score for each set of browser attributes received by the multi-tenant system 110 for the user. The browser score indicates whether the browser was previously used by the user and was properly authenticated. For example, browser B1 may have a browser score indicating that the browser is being regularly used by the user. In contrast, the browser B2 used at time 440 may have a browser score indicating that browser B2 was not previously used by the user and there is a strong likelihood that a session token is being shared across browsers resulting in unauthorized resource usage.

Figure 5:
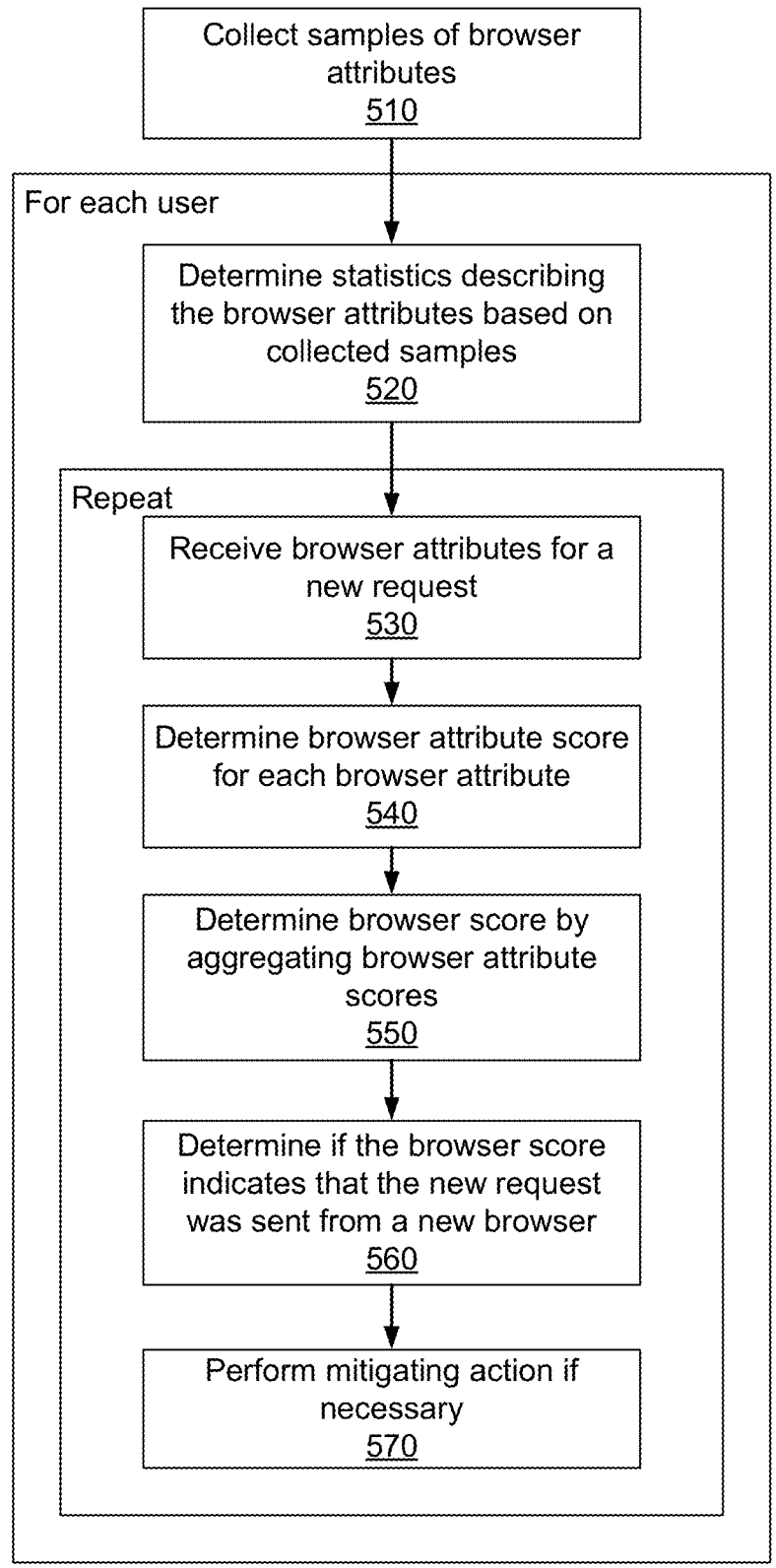
FIG. 5 is a flow chart illustrating the process for determining unauthorized resource utilization, according to one embodiment.

FIG. 5 is a flow chart illustrating the process for determining unauthorized resource utilization according to one embodiment. Other embodiments can perform the steps of FIG. 4 in different orders. Moreover, other embodiments can include different and/or additional steps than the ones described herein.

The multi-tenant system 110 collects 510 samples of browser attributes over a time interval. The samples are assumed to be based on sessions that provided valid credentials. Each sample typically includes a plurality of browser attributes that were received from a particular browser.

The multi-tenant system 110 repeats the following steps for each user. The multi-tenant system 110 determines 520 statistics describing the browser attributes based on the collected samples. The statistics are determined for each user or each user account. In an embodiment, the multi-tenant system 110 continuously updates the statistics describing the browser attributes as it receives new requests and collects browser attributes for the requests.

The multi-tenant system 110 repeats the following steps, for example, for each new request received. The multi-tenant system 110 receives 530 browser attributes for a new request. The request may be for access to a resource of the multi-tenant system and is received from a browser executing on a client device 115 associated with the tenant. Examples of resources include applications running on the multi-tenant system 110 or databases stored on the multi-tenant system 110. For example, a user may send a request via a browser to run an application on the multi-tenant system 110 or perform a query or execute a transaction on a database stored on the multi-tenant system 110.

The multi-tenant system 110 determines browser attribute score for each browser attribute. The multi-tenant system 110 determines the browser attribute score based on the received value of the browser attribute and the statistical distribution of the browser attribute for the user. The browser attribute score indicates a likelihood of occurrence of the received value of the browser attribute according to the statistical distribution of the browser attribute for that user.

The multi-tenant system 110 determines 550 a browser score by aggregating the browser attribute scores for the various browser attributes. The browser score indicates a likelihood that the new request was sent from a new client device different from the client devices used by the user during the time interval.

In an embodiment, the multi-tenant system 110 determines a probability P(B) representing the likelihood of receiving a browser with the given set of browser attribute values using by the following equation.

$$P(B) = \Pi_{i=1}^{F} P(B_i) \quad (1)$$

In this equation, $P(B_i)$ represents the probability of occurrence of browser attribute $B_i$, F represents the number of browser attributes, and the operator $\Pi$ represents a product of the terms. Accordingly, the multi-tenant system 110 determines the probability values for each browser attribute and then multiplies them together to get a final probability value for the set of browser attributes. Each probability value is between 0 and 1. A low value of probability P(B) means that the browser B is very unlikely given the user's history and therefore B is a very unlikely browser for this user. Accordingly, there is a high likelihood that the tenant is performing unauthorized resource utilization, for example, by sharing session tokens to allow additional browsers to use the user account.

In an embodiment, the multi-tenant system 110 weighs different attributes differently. Accordingly, the multi-tenant system 110 weighs certain attributes higher than other attributes when aggregating the browser attributes to determine browser score. This is so because differences in values of certain browser attributes is a stronger indicator that the browser attributes are from two different instances of browsers than other browser attributes. For example, while aggregating the browser attribute scores, the multi-tenant system 110 assigns higher weight to browser attributes representing (1) platform of the client device running the browser or (2) CPU Class of the client device running the browser compared to browser attributes representing (1) user agent of the browser or (2) plugins of the browser. Since different plugins may be installed at different time on a browser, the value of plugins browser attribute can change over time. As a result, differences in the plugins browser attribute is not a very strong indicator that two distinct plugins values are from two different browsers. However, the CPU class browser attribute is not likely to change for a given browser instance. Therefore, receiving two different CPU class browser attribute values is a strong indicator that the values were received from distinct browser instances or from two distinct client devices. In an embodiment, the multi-tenant system 110 scales the probability values $P(B_i)$ for different types of browser attributes while ensuring that the aggregate value of P(B) stays between 0 and 1. Accordingly, the multi-tenant system 110 may use a mixture model. The weight of a particular attribute may be accounted for as another probability value that is included in the aggregate function of equation (1). Accordingly, each probability value may be scaled according to its significance in determining the browser score.

The browser score S is determined using the following equation that subtracts from 1, the value P(B) representing a likelihood of occurrence of a browser.

$$S = 1 - P(B) \quad (2)$$

The multi-tenant system 110 uses the score S to determine whether the new request was sent from a new client device different from the client devices used by the user during the time interval for which the statistics were collected. The multi-tenant system 110 detects 450 unauthorized resource utilizations based on the browser score, for example, if the browser score S is below a threshold value. If the multi-tenant system 110 detects unauthorized resource utilization, the multi-tenant system 110 performs 460 mitigating actions as described in connection with mitigation action module 240.

In an embodiment, the multi-tenant system 110 also determines whether the browser that sent the set of browser attributes is from the tenant of the user, i.e., the same organization or enterprise that the user belongs to and has an agreement with the multi-tenant system 110. The multi-tenant system 110 determines that the browser attributes represent the same tenant as the user based on the values of specific browser attributes, for example, the internet protocol (IP) address or the autonomous system number (ASN).

In an embodiment, the multi-tenant system 110 generates a histogram of the tenant's ASN for all the users and sessions using data collected over a time interval, for example, last 30 days of data. Accordingly, the multi-tenant system 110 generates statistical information describing the ASNs that belong to a set of users, for example, the tenant/organization in question. If a new set of browser attributes from a browser are received, the multi-tenant system 110 computes the probability (say, $P_{ASN}$) that the ASN of the new browser belongs to the set of users e.g., the tenant. If the multi-tenant system 110 determines that this probability $P_{ASN}$ is high, then the multi-tenant system 110 determines that this browser does not represent stolen credentials. If the probability $P_{ASN}$ is low, then the multi-tenant system 110 determines that this browser is associated with stolen credentials/session token and the multi-tenant system 110 ignores this browser from the point of view of license abuse/overutilization. If the probability $P_{ASN}$ is high, then the multi-tenant system 110 proceeds to compute the score S using equation (2) using the rest of the browser features (except ASN and IP address). If this score S is more than a threshold, then it's likely license overutilization. If the score S is below a threshold, then the multi-tenant system 110 determines that the browser likely belongs to that client device and the multi-tenant system 110 continues processing the requests from that browser.

In an embodiment, the multi-tenant system 110 determines statistics describing these specific browser attributes such as IP address and ASN for the tenant. The statistics may comprise a histogram of values of these browser attributes collected across individual users, or sets of users, for example, all users of the tenant. The multi-tenant system 110 compares the received values of the above attributes with statistical distribution of these attributes for the tenant to determine a likelihood that the received browser attribute values represent a browser that was previously used by a user of the set of users (e.g., the tenant representing all users of the tenant) during the interval in which samples of browser attributes were collected. If the multi-tenant system 110 determines that the likelihood of the new browser being previously used by any user of the tenant is below a threshold, the multi-tenant system 110 determines that the browser belongs to an organization different from the organization representing the tenant.

If the multi-tenant system 110 determines that the received sample browser attributes is from an organization or enterprise different from the organization or enterprise of the user, the multi-tenant system 110 makes a determination that this request does not represent an unauthorized resource utilization by the tenant. The multi-tenant system 110 may make a different determination that there is a security breach of the enterprise of the user and session tokens are being stolen by a client device outside the enterprise. The mitigating actions taken in response to determining a security breach may be different from mitigating actions taken in response to detecting unauthorized resource utilization. As a mitigating action, the multi-tenant system may report a security breach to the tenant.

Computer Architecture

Figure 6:
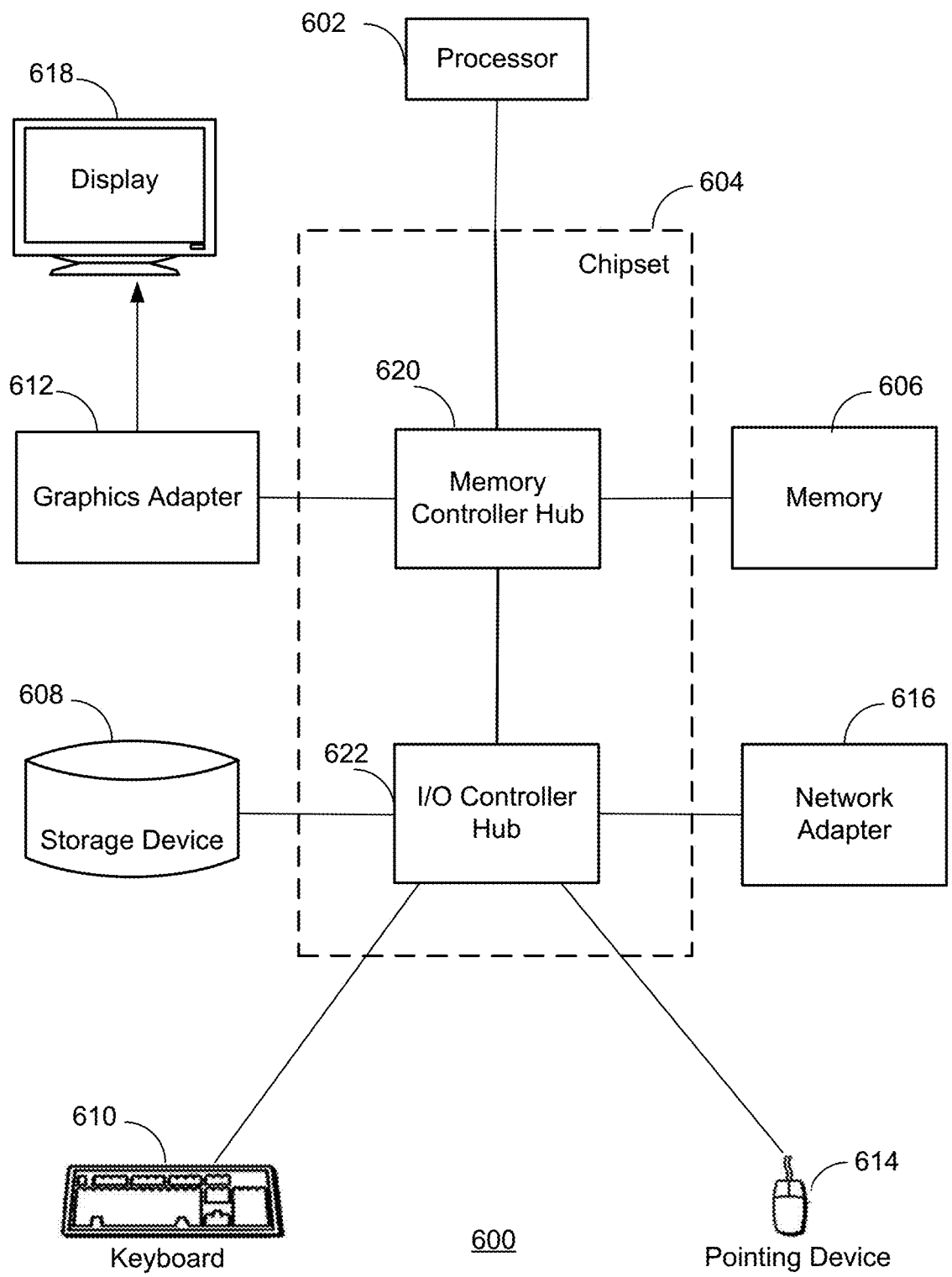
FIG. 6 is a block diagram illustrating a functional view of a typical computer system for use in the environment of FIG. 1, according to one embodiment.

FIG. 6 is a high-level block diagram illustrating a functional view of a typical computer system for use as one of the entities illustrated in the environment 100 of FIG. 1 according to an embodiment. Illustrated are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604.

The storage device 608 is a non-transitory computer-readable storage medium, such as a hard drive, compact disk read-only memory (CD-ROM), DVD, or a solid-state memory device. The memory 606 holds instructions and data used by the processor 602. The pointing device 614 may be a mouse, track ball, or other type of pointing device, and is used in combination with the keyboard 610 to input data into the computer system 200. The graphics adapter 612 displays images and other information on the display 618. The network adapter 616 couples the computer system 600 to a network.

As is known in the art, a computer 600 can have different and/or other components than those shown in FIG. 6. In addition, the computer 600 can lack certain illustrated components. For example, a computer system 600 acting as a multi-tenant system 110 may lack a keyboard 610 and a pointing device 614. Moreover, the storage device 608 can be local and/or remote from the computer 600 (such as embodied within a storage area network (SAN)).

The computer 600 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 608, loaded into the memory 606, and executed by the processor 602.

The types of computer systems 600 used by the entities of FIG. 1 can vary depending upon the embodiment and the processing power used by the entity. For example, a client device 115 may be a mobile phone with limited processing power, a small display 618, and may lack a pointing device 614. The multi-tenant system 110 and the secondary platform 120, in contrast, may comprise multiple blade servers working together to provide the functionality described herein.

Additional Considerations

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

We claim:

1. A computer implemented method for detecting unauthorized resource utilization by an organization, the method comprising:
    collecting, by an online system, over a time interval, samples of browser attributes from browsers used by one or more users of an organization, wherein the one or more users are authorized to access a resource;
    determining statistical distributions of one or more browser attributes based on the collected samples for a user;
    receiving values of browser attributes for a new request received from the user;
    for one or more of the browser attributes corresponding to the new request, determining a browser attribute score based on a received value of a browser attribute and the statistical distribution of the browser attribute for the user;
    aggregating the browser attribute scores for the one or more browser attributes to determine a score indicating a likelihood that the new request was sent from a new client device different from the client devices used by the user during the time interval;
    responsive to determining that the score indicates that the new request was sent by the new client device, detecting unauthorized resource utilization by the organization by sharing sessions across client devices; and
    responsive to detecting unauthorized resource utilization by the organization, requesting credentials for authenticating the request.

2. The computer implemented method of claim 1, wherein the browser attributes comprise one or more of: an internet protocol (IP) address, a platform, a central processing unit (CPU) class, a platform, or plugins.

3. The computer implemented method of claim 1, wherein the statistics describing a browser attribute comprise, for each distinct value of the browser attribute, a measure of frequency of occurrence of the distinct value in the samples of browser attributes.

4. The computer implemented method of claim 1, wherein the statistics describing a browser attribute comprises, a measure frequency of occurrence of each of a plurality of ranges of values of the browser attribute.

5. The computer implemented method of claim 1, wherein the browser attribute score for each browser attribute indicates a likelihood of occurrence of the received value of the browser attribute determined based on the statistics of the browser attribute.

6. The computer implemented method of claim 1, wherein aggregating the browser attribute scores comprises determining a product of the browser attribute scores.

7. The computer implemented method of claim 1, wherein aggregating the browser attribute scores comprises assigning higher weight to browser attributes representing (1) platform of the client device running the browser or (2) CPU Class of the client device running the browser compared to browser attributes representing (1) user agent of the browser or (2) plugins of the browser.

8. The computer implemented method of claim 1, further comprising, performing a mitigation action comprising one or more of:
    invalidating a session token provided to the user;
    requiring user to re-authenticate; or
    logging user out.

9. The computer implemented method of claim 1, further comprising:
    determining that the browser that provided the browser attributes is from an organization of the user, the determining based on values of one or more browser attributes including: internet protocol (IP) address or autonomous system number (ASN); and
    wherein unauthorized resource utilization is detected responsive to determining that the browser that provided the browser attributes is from the organization of the user.

10. The computer implemented method of claim 1, wherein the online system is a multi-tenant system, further comprising:
    determining that the received browser attributes are from a browser of a tenant of the user.

11. A non-transitory computer readable storage medium for storing instructions that when executed by a computer processor cause the computer processor to perform steps for detecting unauthorized resource utilization by an organization, the steps comprising:
    collecting, over a time interval, samples of browser attributes from browsers used by authorized users to access a resource, wherein the samples are collected over a time interval;
    determining statistical distributions of one or more browser attributes based on the collected samples for a user;
    receiving values of browser attributes for a new request received from the user;
    for one or more of the browser attributes corresponding to the new request, determining a browser attribute score based on a received value of a browser attribute and the statistical distribution of the browser attribute for the user;
    aggregating the browser attribute scores for the one or more browser attributes to determine a score indicating a likelihood that the new request was sent from a new client device different from the client devices used by the user during the time interval;
    responsive to determining that the score indicates that the new request was sent by the new client device, detecting unauthorized resource utilization by the organization by sharing sessions across client devices; and
    responsive to detecting unauthorized resource utilization by the organization, requesting credentials for authenticating the request.

12. The non-transitory computer readable storage medium of claim 11, wherein the browser attributes comprise one or more of: an internet protocol (IP) address, a platform, a central processing unit (CPU) class, a platform, or plugins.

13. The non-transitory computer readable storage medium of claim 11, wherein the statistics describing a browser attribute comprise, for each distinct value of the browser attribute, a measure of frequency of occurrence of the distinct value in the samples of browser attributes.

14. The non-transitory computer readable storage medium of claim 11, wherein the statistics describing a browser attribute comprises, a measure frequency of occurrence of each of a plurality of ranges of values of the browser attribute.

15. The non-transitory computer readable storage medium of claim 11, wherein the browser attribute score for each browser attribute indicates a likelihood of occurrence of the received value of the browser attribute determined based on the statistics of the browser attribute.

16. The non-transitory computer readable storage medium of claim 11, wherein aggregating the browser attribute scores comprises determining a product of the browser attribute scores.

17. The non-transitory computer readable storage medium of claim 11, wherein aggregating the browser attribute scores comprises assigning higher weight to browser attributes representing (1) platform of the client device running the browser or (2) CPU Class of the client device running the browser compared to browser attributes representing (1) user agent of the browser or (2) plugins of the browser.

18. The non-transitory computer readable storage medium of claim 11, wherein the instructions further cause the computer processor to perform steps comprising, performing a mitigation action comprising one or more of:
  invalidating a session token provided to the user;
  requiring user to re-authenticate; or
  logging user out.

19. The non-transitory computer readable storage medium of claim 11, wherein the instructions further cause the computer processor to perform steps comprising:
  determining that the browser that provided the browser attributes is from an organization of the user, the determining based on values of one or more browser attributes including: internet protocol (IP) address or autonomous system number (ASN); and
  wherein unauthorized resource utilization is detected responsive to determining that the browser that provided the browser attributes is from the organization of the user.

20. A computer system comprising:
a computer processor; and
a non-transitory computer readable storage medium for storing instructions that when executed by a computer processor cause the computer processor to perform steps for detecting unauthorized resource utilization by an organization, the steps comprising:
  collecting, over a time interval, samples of browser attributes from browsers used by one or more users of an organization, wherein the one or more users are authorized to access a resource;
  determining statistical distributions of one or more browser attributes based on the collected samples for a user;
  receiving values of browser attributes for a new request received from the user;
  for one or more of the browser attributes corresponding to the new request, determining a browser attribute score based on a received value of a browser attribute and the statistical distribution of the browser attribute for the user;
  aggregating the browser attribute scores for the one or more browser attributes to determine a score indicating a likelihood that the new request was sent from a new client device different from the client devices used by the user during the time interval;
  responsive to determining that the score indicates that the new request was sent by the new client device, detecting unauthorized resource utilization by the organization by sharing sessions across client devices; and
  responsive to detecting unauthorized resource utilization by the organization, requesting credentials for authenticating the request.

* * * * *